M. L. HODSON.
MACHINE FOR CUTTING CLOTH.
No. 187,383. Patented Feb. 13, 1877.
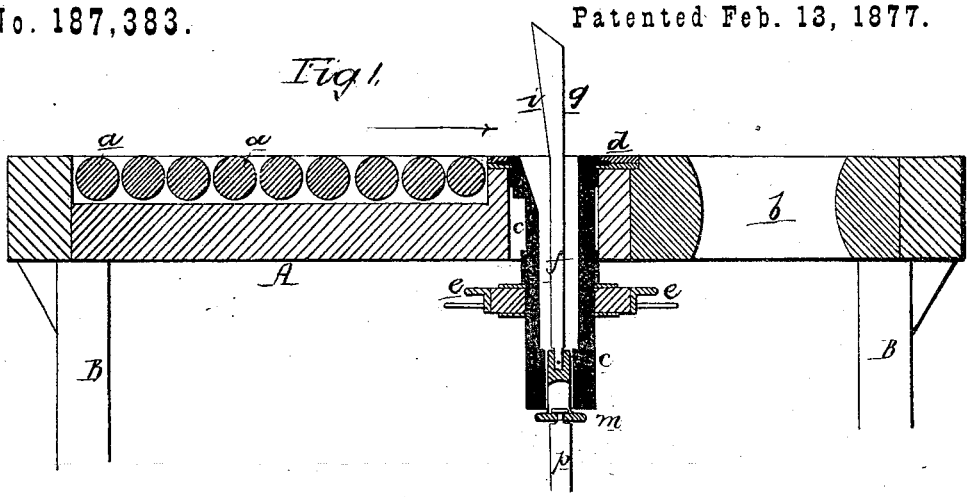
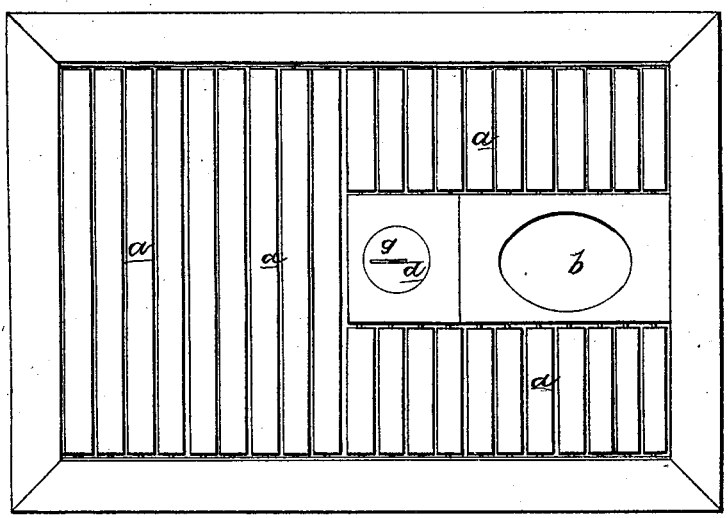
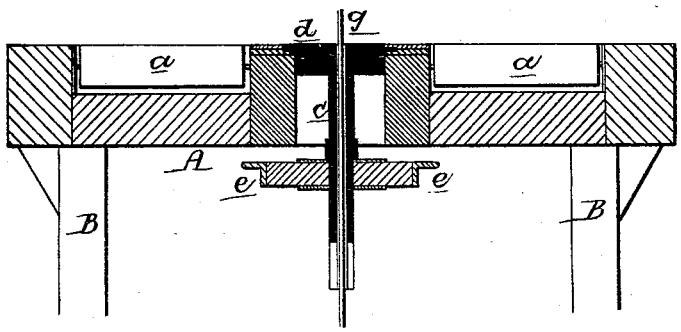
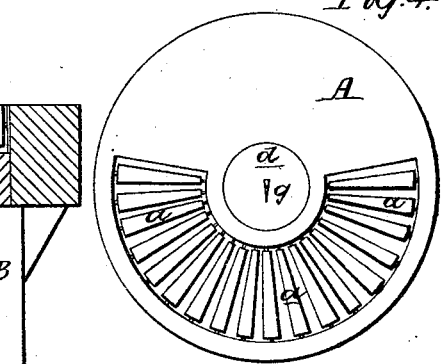
Witnesses
Harry Howson Jr
Harry Smith
Marquis L. Hodson
by his Attorneys
Howson and Son

UNITED STATES PATENT OFFICE.

MARQUIS L. HODSON, OF CAMDEN, NEW JERSEY, ASSIGNOR OF ONE-HALF HIS RIGHT TO HENRY F. SCATCHARD AND HIRAM HOFFMAN, OF PHILADELPHIA, PENNSYLVANIA.

IMPROVEMENT IN MACHINES FOR CUTTING CLOTH.

Specification forming part of Letters Patent No. 187,383, dated February 13, 1877; application filed May 25, 1876.

*To all whom it may concern:*

Be it known that I, MARQUIS L. HODSON, of Camden, New Jersey, have invented an Improved Machine for Cutting Cloth, of which the following is a specification:

The object of my invention is to construct a machine for rapidly cutting out garments from cloth, and this object I attain in the manner which I will now proceed to describe, reference being had to the accompanying drawing, in which—

Figure 1 is a longitudinal vertical section of my improved cutting apparatus; Fig. 2, a transverse section of the same; Fig. 3, a plan view drawn to a reduced scale; and Fig. 4 a modification.

A is a bed or table supported upon legs B, the upper surface of the table being composed partly of anti-friction rollers $a$, as shown, and said table having, in the present instance, an opening, $b$, in which the operator stands. Immediately adjacent to this opening there is a disk or plate, $d$, sunk into the top of the table, and this plate has a shank, $c$, extending down through the table and provided beneath the same with a hand-wheel, $e$, by which it may be turned in any desired direction. Sliding vertically in, but incapable of turning independently of, the plate and its shank is a stem, $f$, the upper end of which is attached to or formed into a knife, $g$, narrowest at the lower end, but gradually widening toward the top, so as to form an inclined cutting-edge, $i$, as shown in Fig. 1. The lower end of the stem $f$ of the knife is provided with a head, $m$, to which is swiveled the upper end of a rod, $p$, which is reciprocated vertically by an eccentric crank, or other equivalent device, the swivel-joint permitting the turning of the knife without interfering with its reciprocating movement.

The cloth is fed across the table in the direction of the arrow and pressed against the inclined cutting-edge $i$ of the knife, and, as the latter is depressed, this inclined edge cuts into the cloth with a slicing action, the knife on its upward movement freeing itself from the cut previously made, and allowing the cloth to be again fed forward.

By operating the hand-wheel $e$, the knife may be easily turned so as to conform to the lines defining the shape of the garment which is being cut out, while the anti-friction rollers permit the layers of cloth to be fed easily over the table toward the knife.

In some cases the rollers may be arranged radially in respect to the knife, as shown in Fig. 4, in order to facilitate the ready feeding of the cloth in any direction toward the knives.

It will be evident that by employing a vertically-reciprocating knife with an inclined cutting-edge, $i$, as described, a number of thicknesses of cloth can be cut with far less expenditure of power than when the cutting portion of the knife descends vertically upon the cloth.

I claim as my invention—

1. The combination, in a cloth-cutting machine, of a cutting-table or bed with a vertically-reciprocating knife guided in and projecting above the table, and gradually widened from the lower to the upper end, so as to form an inclined cutting edge $i$, at one side, as described.

2. A cloth-cutting machine having a table composed partly of anti-friction rollers, as set forth.

In testimony whereof I have signed my name to this specification in the presence of two subscribing witnesses.

MARQUIS L. HODSON.

Witnesses:
 HARRY HOWSON, Jr.,
 HARRY SMITH.